United States Patent
Huang

(10) Patent No.: US 7,605,771 B2
(45) Date of Patent: Oct. 20, 2009

(54) IMAGE-PROCESSING SYSTEM CAPABLE OF CONTROLLING MULTIPLE DISPLAY DEVICES

(75) Inventor: Wei-Chih Huang, Taipei (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 402 days.

(21) Appl. No.: 11/563,690

(22) Filed: Nov. 28, 2006

(65) Prior Publication Data

US 2007/0256104 A1    Nov. 1, 2007

(30) Foreign Application Priority Data

Apr. 27, 2006    (TW) ............................... 95115133 A

(51) Int. Cl.
*G09G 5/00*    (2006.01)
(52) U.S. Cl. ......................................... 345/1.1; 345/1.2
(58) Field of Classification Search .................. 345/1.1, 345/1.2, 2.1, 2.2, 3.1; 250/221
See application file for complete search history.

(56) References Cited

U.S. PATENT DOCUMENTS

| | | | | |
|---|---|---|---|---|
| 4,769,555 A | * | 9/1988 | Pequet et al. | 307/141 |
| 2005/0135023 A1 | * | 6/2005 | Goder et al. | 361/18 |
| 2006/0218595 A1 | * | 9/2006 | Chang | 725/75 |
| 2006/0267667 A1 | * | 11/2006 | Kojima | 327/427 |

* cited by examiner

*Primary Examiner*—Chanh Nguyen
*Assistant Examiner*—Kwang-Su Yang
(74) *Attorney, Agent, or Firm*—Winston Hsu

(57) ABSTRACT

An image-processing system includes a power source, a plurality of signal processing circuits, and a plurality of switching units. The power source provides power to the image-processing system. The signal processing circuits, each including a first input end, a second input end and an output end, generate output image signals at the output ends according to input image signals received at the first input ends. The switching units, each having an input end coupled to the power source, an output end coupled to the second input end of a corresponding signal processing circuit and a control end, connect corresponding signal processing circuits to the power source, or isolate corresponding signal processing circuits from the power source according to control signals received at the control ends.

9 Claims, 4 Drawing Sheets

IMAGE-PROCESSING SYSTEM CAPABLE OF CONTROLLING MULTIPLE DISPLAY DEVICES

BACKGROUND

1. Field of the Invention

The present invention relates to an image-processing system, and more particularly, to an image-processing system capable of controlling multiple display devices.

2. Description of the Prior Art

Digital video disk (DVD) players are multimedia devices commonly found in households, and are more and more widely used in automobile applications. With the rapid development and sharp price drops of various display panels, together with the introduction of digital television, automobile multimedia devices have become more and more popular.

Reference is made to FIG. 1 for a functional block diagram of a prior art automobile DVD system 10. The automobile DVD system 10 includes a power source 12, a signal processing circuit 14, and a screen 16. The screen 16 is coupled to the power source 12 via the signal processing circuit 14. The power source 12 provides power for operating the screen 16. The screen 16 can then display images based on an image output signal generated by the signal processing circuit 14.

In order to allow passengers seated at the front and back seats of a car to view a video simultaneously, more and more automobile DVD systems include multiple screens. Reference is made to FIG. 2 for a functional block diagram of another prior art automobile DVD system 20. The automobile DVD system 20 includes a power source 22, a plurality of signal processing circuits 24, and a plurality of screens 26. The screens 26 are coupled to the power source 22 via corresponding signal processing circuits 24. The power source 22 provides power for operating the screens 26. Each screen 26 can then display images based on an image output signal generated by a corresponding signal processing circuit 24. In the prior art automobile DVD system 20, images can be simultaneously displayed on multiple screens for different passengers to view in a car. However, a passenger cannot control each screen 26 separately. For example, if there is only one passenger in the car using the prior art automobile DVD system 20 for viewing a video, all the screens 26 will display the same images even if the passenger only watches a certain screen 26. Therefore, the prior art automobile DVD system 20 consumes more power.

SUMMARY OF THE INVENTION

The claimed invention provides an image-processing system capable of controlling multiple display devices comprising a power source for providing power to the image-processing system; a plurality of signal processing circuits each including a first input end coupled to receive an image input signal, a second input end, and an output end for outputting an image output signal generated by signal-processing the image input signal; and a plurality of switching units each including an input end coupled to the power source, an output end coupled to the second input end of a corresponding signal processing circuit, and a control end coupled to receive a control signal based on whether the corresponding signal processing circuit is to be electrically connected to the power source or isolated from the power source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
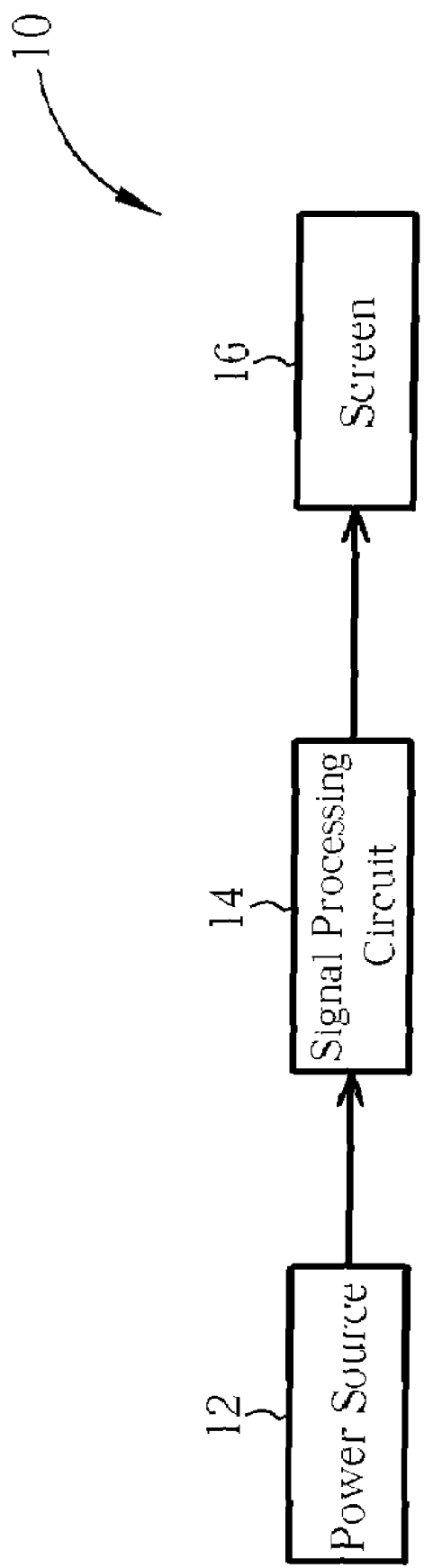
FIG. 1 is a functional block diagram of a prior art automobile DVD system.
Figure 2:
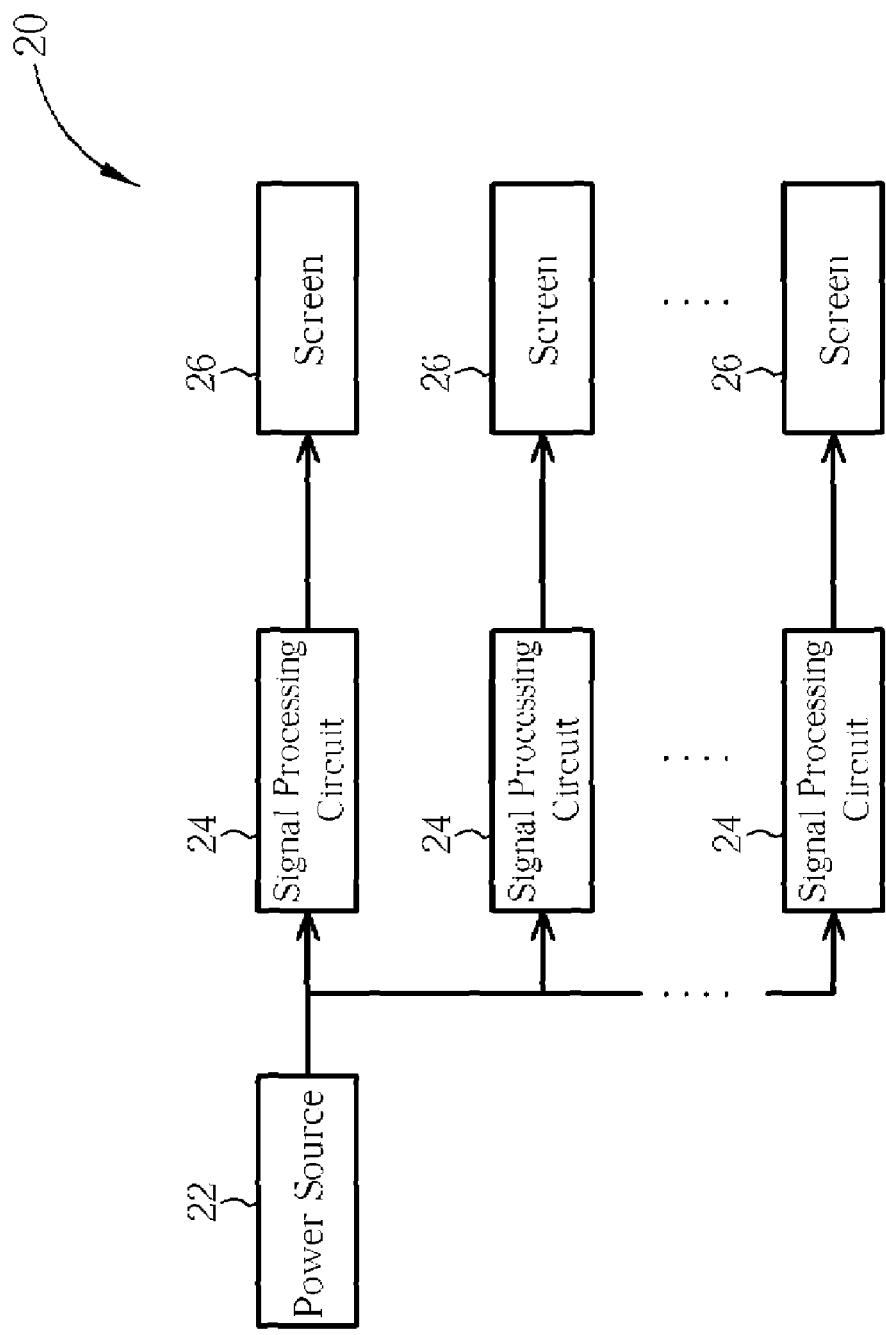
FIG. 2 is a functional block diagram of another prior art automobile DVD system.
Figure 3:
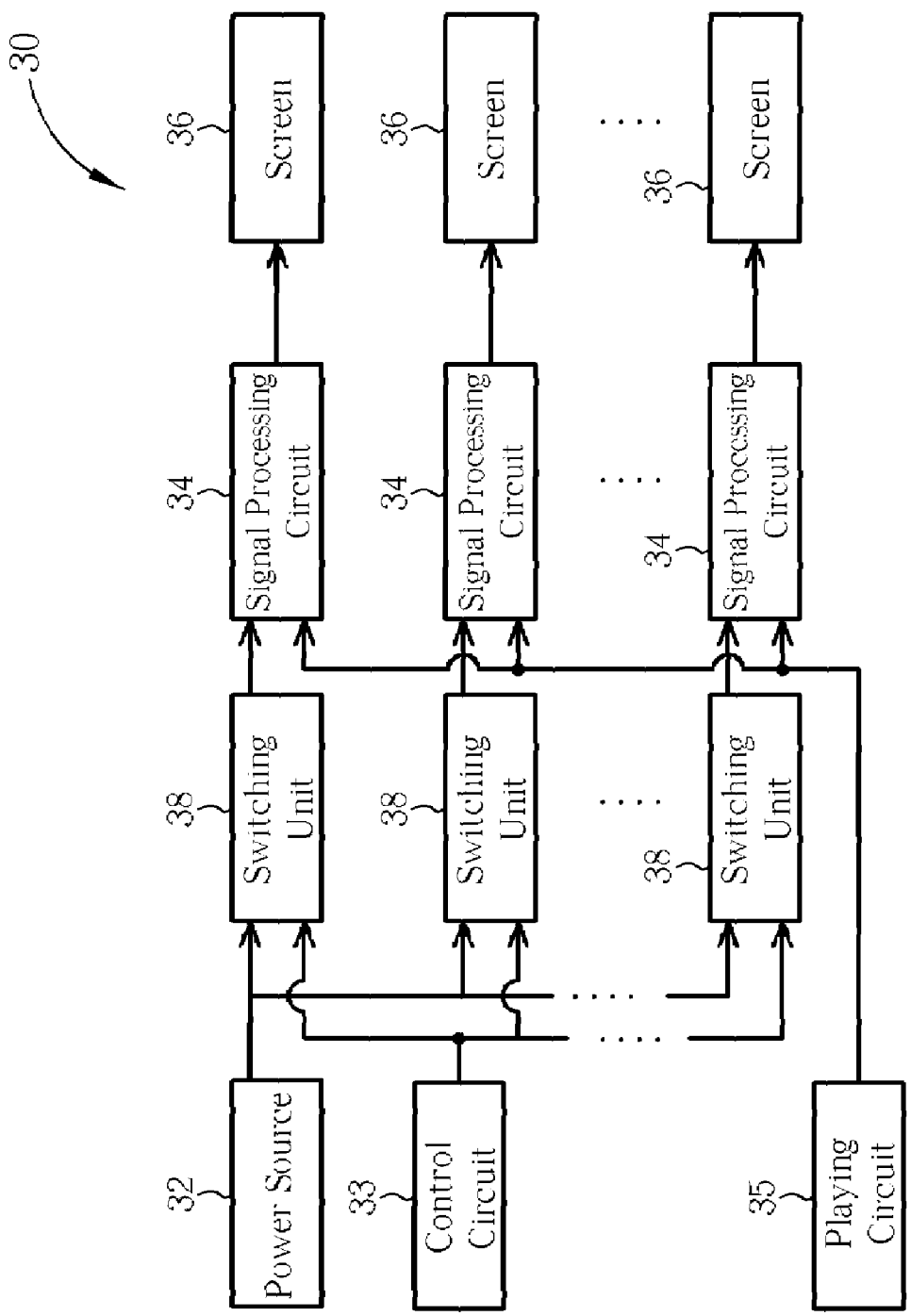
FIG. 3 is a functional block diagram of an automobile DVD system according to the present invention.

Reference is made to FIG. 3 for a functional block diagram of an automobile DVD system 30 according to the present invention. The automobile DVD system 30 includes a power source 32, a control circuit 33, a plurality of signal processing circuits 34, a playing circuit 35, a plurality of screens 36, and a plurality of switching units 38. The power source 32 can provide power required for operating the signal processing circuits 34 and the screens 36. The playing circuit 35, coupled to the plurality of signal processing circuits 34, generates an image input signal corresponding to display images and sends the image input signal to each signal processing circuit 34, which then outputs a corresponding image output signal to a corresponding screen 36. The plurality of switching units 38 are turned on or turned off based on corresponding control signals generated by the control circuit 33. Each screen 36, coupled to the power source 32 via a corresponding switching unit 38 and a corresponding signal processing circuit 34, displays images based on the image output signal generated by the corresponding signal processing circuit 34. When a control signal turns on a switching unit 38, its corresponding screen 36 is electrically connected to the power source 32 and its corresponding signal processing circuit 34. Therefore, the corresponding screen 36 can receive power from the power source 32 and display images based on the image output signal generated by the corresponding signal processing circuit 34. When a control signal turns off a switching unit 38, its corresponding screen 36 and signal processing circuit 34 are electrically isolated from the power source 32. Therefore, the corresponding screen 36 will not display images. In the automobile DVD system 30 of the present invention, the switching units 38 control the signal paths from the power source 32 to the signal processing circuits 34 and the screens 36. The user can flexibly choose from displaying images on all screens 36, or merely on some of the screens 36.

Figure 4:
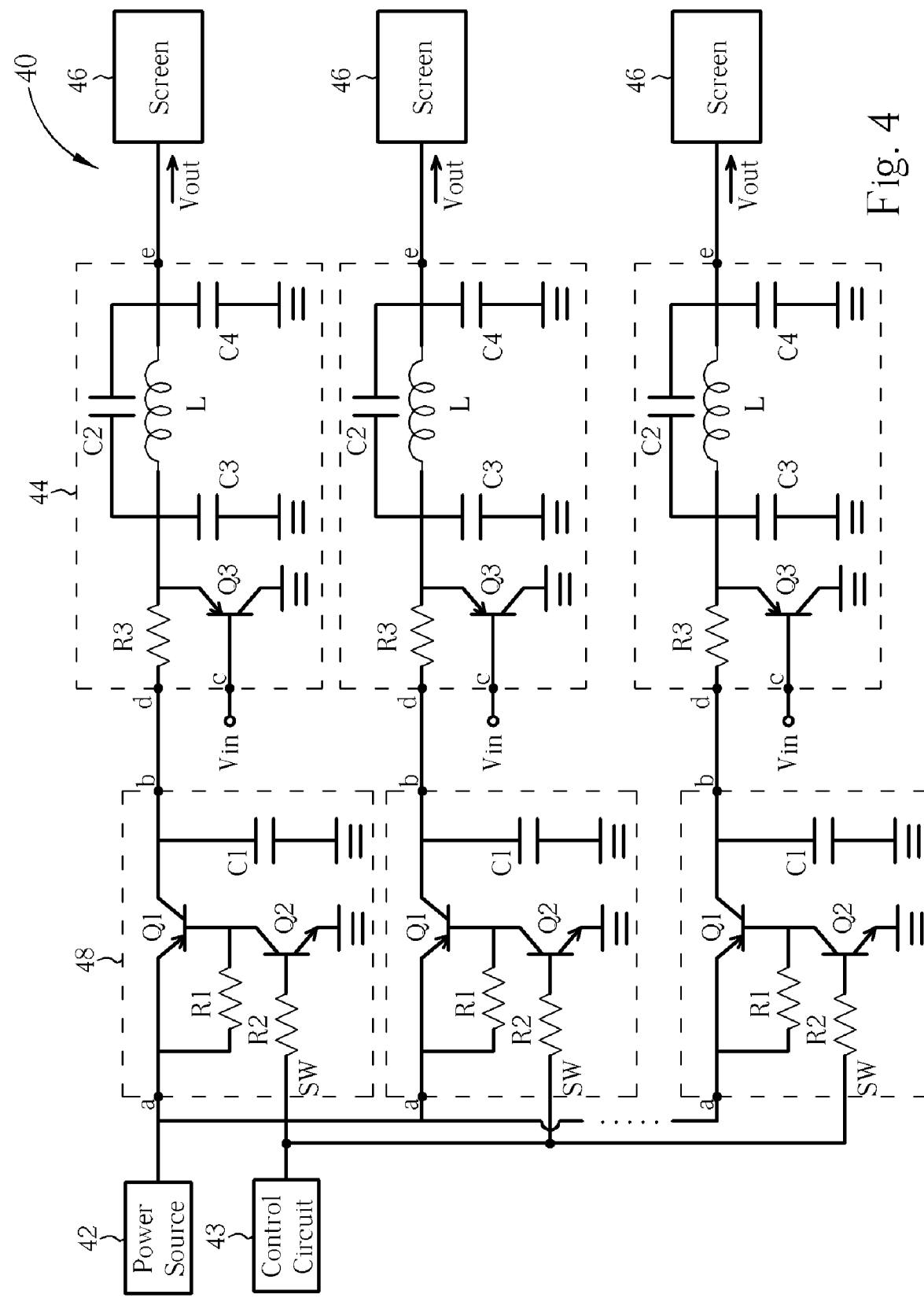
FIG. 4 is a diagram of an automobile DVD system according to an embodiment of the present invention.

Reference is made to FIG. 4 for a diagram of an automobile DVD system 40 according to an embodiment of the present invention. The automobile DVD system 40 includes a power source 42, a control circuit 43, a plurality of signal processing circuits 44, a plurality of screens 46, and a plurality of switching units 48. Each switch unit 48 includes an input end "a" coupled to the power source 42. Each signal processing circuit 44 includes a second input end "d" coupled to an output end "b" of a corresponding switching unit 48, and an output end "e" coupled to a corresponding screen 46. When a control signal SW generated by the control circuit 43 turns on a switching unit 48, the power source 42 can be coupled to a corresponding signal processing circuit 44 via the turned-on switching unit 48. Next, the corresponding signal processing circuit 44 processes an image input signal Vin received at a first input end "c", generates a corresponding image output signal Vout at the output end "e", and sends the image output signal Vout to a corresponding screen 46 for displaying images. In the embodiment shown in FIG. 4, the image input signal Vin can be generated by the playing circuit 35 in FIG. 3.

In the automobile DVD system 40 shown in FIG. 4, each switching unit 48 includes a first capacitor C1, a first transistor Q1, a second transistor Q2, a first resistor R1, and a second resistor R2. The first and second transistors Q1 and Q2 can include bipolar junction transistors (BJTs), metal oxide semiconductor field effect transistors (MOSFETs), or other devices providing similar functions. In this embodiment, BJTs are used for illustrating the present invention. The first transistor Q1 includes an emitter coupled to the input end "a" of the switching unit 48, a collector coupled the output end "b" of the switching unit 48, and a base coupled to the emitter via the first resistor R1. The second transistor Q2 includes an emitter coupled to ground, a collector coupled to the base of the first transistor Q1, and a base coupled to receive the control signal SW via the second resistor R2. When a user applies the control signal SW for turning on the second transistor Q2, a voltage difference established across the first resistor R1 subsequently turns on the first transistor Q1 and thus electrically connects the input end "a" and the output end "b" of the switching circuit 48.

In the automobile DVD system 40 shown in FIG. 4, each signal processing circuit 44 includes a second through a fourth capacitors C2-C4, an inductor L, a third transistor Q3, and a third resistor R3. The third transistor Q3 can include a BJT, a MOSFET, or other devices providing similar functions. In this embodiment, a BJT is used for illustrating the present invention. The third transistor Q3 includes an emitter coupled to the second end "d" of the signal processing circuit 44 via the third resistor R3, a collector coupled to ground, and a base coupled to the first input end "c" of the signal processing circuit 44. The second capacitor C2 is coupled in parallel with the inductor L, and the second capacitor C2 and the inductor L are coupled between the emitter of the third transistor Q3 and the output end "e" of the signal processing circuit 44. The signal processing circuit 44 enlarges the image input signal Vin received at the first input end "c", outputs the corresponding image output signal Vout at the output end "e", and sends the image output signal Vout to the corresponding screen 46.

In the present invention, the user can control the screens 46 by applying the control signal SW using the control circuit 33 in FIG. 3. When the control signal SW turns on a switching unit 48, its corresponding screen 46 is electrically connected to the power source 42 and its corresponding signal processing circuit 44. Therefore, the corresponding screen 46 can receive power from the power source 42 and display images based on the image output signal Vout generated by the corresponding signal processing circuit 44. The user can flexibly control the number of screens 46 that are displaying images. Using the control signal SW generated by the control circuit 43, each screen 46 can be activated or de-activated. In the afore-mentioned embodiments, automobile DVD systems are used for illustrating the present invention, but do not limit the scope of the present invention. The present invention can also be applied to other image-processing systems providing multiple screen outputs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image-processing system capable of controlling multiple display devices comprising:
   a power source for providing power to the image-processing system;
   a plurality of signal processing circuits each including:
   a first input end coupled to receive an image input signal;
   a second input end; and
   an output end for outputting an image output signal generated by signal-processing the image input signal; and
   a plurality of switching units each including:
   an input end coupled to the power source;
   an output end coupled to the second input end of a corresponding signal processing circuit; and
   a control end coupled to receive a control signal, the corresponding signal processing circuit being electrically connected to the power source or isolated from the power source according to the control signal;
   wherein each signal processing circuit includes a transistor having a first end coupled to the second input end of the signal processing circuit, a second end coupled to ground, and a control end coupled to the first input end of the signal processing circuit for enlarging the image input signal received at the control end of the transistor.

2. The image-processing system of claim 1 further comprising:
   a plurality of display devices each coupled to the output end of a corresponding signal processing circuit and displaying images according to the image output signal outputted from the output end of the corresponding signal processing circuit.

3. The image-processing system of claim 2 wherein the plurality of display devices include display screens of automobile digital versatile disc (DVD) players.

4. The image-processing system of claim 1 further comprising:
   a playing circuit coupled to the first input end of each signal processing circuit for generating the image output signal based on display images.

5. The image-processing system of claim 1 wherein each switching unit comprises:
   a first transistor having a first end coupled to the input end of the switching device and a second end coupled to the output end of the switching device;
   a second transistor having a first end coupled to ground and a second end coupled to a control end of the first transistor;
   a first resistor coupled between the first end and the control end of the first transistor;
   a second resistor coupled between a control end of the second transistor and the control end of the switching unit; and
   a capacitor coupled between the second end of the first transistor and ground.

6. The image-processing system of claim 5 wherein the first and second transistors each include bipolar junction transistors (BJTs) or metal oxide semiconductor field effect transistors (MOSFETs).

7. The image-processing system of claim 1 wherein each signal processing circuit further comprises:
   a first capacitor coupled between the first end of the transistor and the output end of the signal processing circuit;
   a second capacitor coupled between the first end of the transistor and ground;
   a third capacitor coupled between the output end of the signal processing circuit and ground;

a third resistor coupled between the first end of the transistor and the second input end of the signal processing circuit; and an inductor coupled between the first end of the transistor and the output end of the signal processing circuit.

8. The image-processing system of claim 1 wherein the transistor includes a BJT or a MOSFET.

9. The image-processing system of claim 1 further comprising a control circuit coupled to the control ends of the switching units for generating a plurality of control signals to corresponding switching units.

* * * * *